US012392308B2

(12) United States Patent
Fernandez-Oxby et al.

(10) Patent No.: US 12,392,308 B2
(45) Date of Patent: Aug. 19, 2025

(54) SYSTEM FOR SUPPLYING GASEOUS FUEL

(71) Applicant: Metier Ventures Limited, Oxfordshire (GB)

(72) Inventors: Owen Fernandez-Oxby, Buckinghamshire (GB); Kyle Darren Webb, Oxfordshire (GB)

(73) Assignee: Metier Ventures Limited, Oxfordshire (GB)

( * ) Notice: Subject to any disclaimer, the term of this patent is extended or adjusted under 35 U.S.C. 154(b) by 0 days.

(21) Appl. No.: 18/422,248

(22) Filed: Jan. 25, 2024

(65) Prior Publication Data

US 2024/0254947 A1 Aug. 1, 2024

(30) Foreign Application Priority Data

Jan. 26, 2023 (GB) .................................... 2301152

(51) Int. Cl.
*F02M 21/02* (2006.01)
*F02M 31/20* (2006.01)

(52) U.S. Cl.
CPC .... *F02M 21/0221* (2013.01); *F02M 21/0206* (2013.01); *F02M 21/0239* (2013.01); *F02M 31/20* (2013.01)

(58) Field of Classification Search
CPC ........... F02M 21/0206; F02M 21/0221; F02M 21/0239; F02M 21/0245; F02M 31/20
See application file for complete search history.

(56) References Cited

U.S. PATENT DOCUMENTS 2,094,978 A * 10/1937 Brown ............... F02M 21/0239 48/180.1
4,520,763 A * 6/1985 Lynch ................... F02D 19/023 123/527

(Continued)

FOREIGN PATENT DOCUMENTS

GB 2610176 A 3/2023
GB 2610180 A 3/2023

(Continued)

OTHER PUBLICATIONS

Combined Search and Examination Report; UK Patent Office; Application No. 2301152.1; Jul. 3, 2023; entire document.

*Primary Examiner* — Carl C Staubach
(74) *Attorney, Agent, or Firm* — ALLEN, DYER, DOPPELT + GILCHRIST, P.A.

(57) ABSTRACT

A system for supplying gaseous fuel to a fuel consumer at a desired supply pressure from a fuel source within which fuel is stored at a storage pressure different from the supply pressure comprises at least two variable volume chambers, and valving for connecting each of the variable volume chambers cyclically and alternately to the fuel source and consumer. During each operating cycle, the valving connects a first of the variable volume chambers to the fuel consumer to supply fuel at the desired supply pressure and connects a second of the variable volume chambers to the fuel source to introduce a quantity of fuel at the storage pressure. The volume of the second variable volume chamber is changed after the introduction of the quantity of fuel therein to change the pressure from the storage pressure to the supply pressure in readiness for an ensuing cycle.

10 Claims, 1 Drawing Sheet

(56) References Cited

U.S. PATENT DOCUMENTS

| | | | | | |
|---|---|---|---|---|---|
| 5,329,908 | A * | 7/1994 | Tarr | F02B 23/0696 | 123/472 |
| 5,868,122 | A * | 2/1999 | Gram | F02M 21/0287 | 123/527 |
| 9,057,348 | B2 * | 6/2015 | Usui | F02M 55/04 | |
| 9,494,074 | B2 * | 11/2016 | Jaasma | F02D 19/0694 | |
| 10,563,588 | B2 * | 2/2020 | Toon | F02C 7/222 | |
| 2009/0266823 | A1 * | 10/2009 | Mazabraud | B29C 70/30 | 264/310 |
| 2010/0163135 | A1 * | 7/2010 | Safronovs | F17C 5/06 | 141/71 |
| 2015/0125323 | A1 * | 5/2015 | Stair | F04B 17/042 | 417/417 |
| 2017/0102111 | A1 * | 4/2017 | McDonald | F17C 13/001 | |
| 2018/0051690 | A1 * | 2/2018 | Stair | F04B 25/02 | |
| 2024/0351432 | A1 * | 10/2024 | Guerrato | F17C 7/00 | |
| 2024/0352899 | A1 * | 10/2024 | Guerrato | F02D 19/0644 | |
| 2024/0352908 | A1 * | 10/2024 | Guerrato | F02M 21/0206 | |
| 2024/0426432 | A1 * | 12/2024 | Lees | F17C 13/04 | |

FOREIGN PATENT DOCUMENTS

| | | | |
|---|---|---|---|
| KR | 1020160075961 | A | 6/2016 |
| WO | WO2009035311 | A1 | 3/2009 |

* cited by examiner

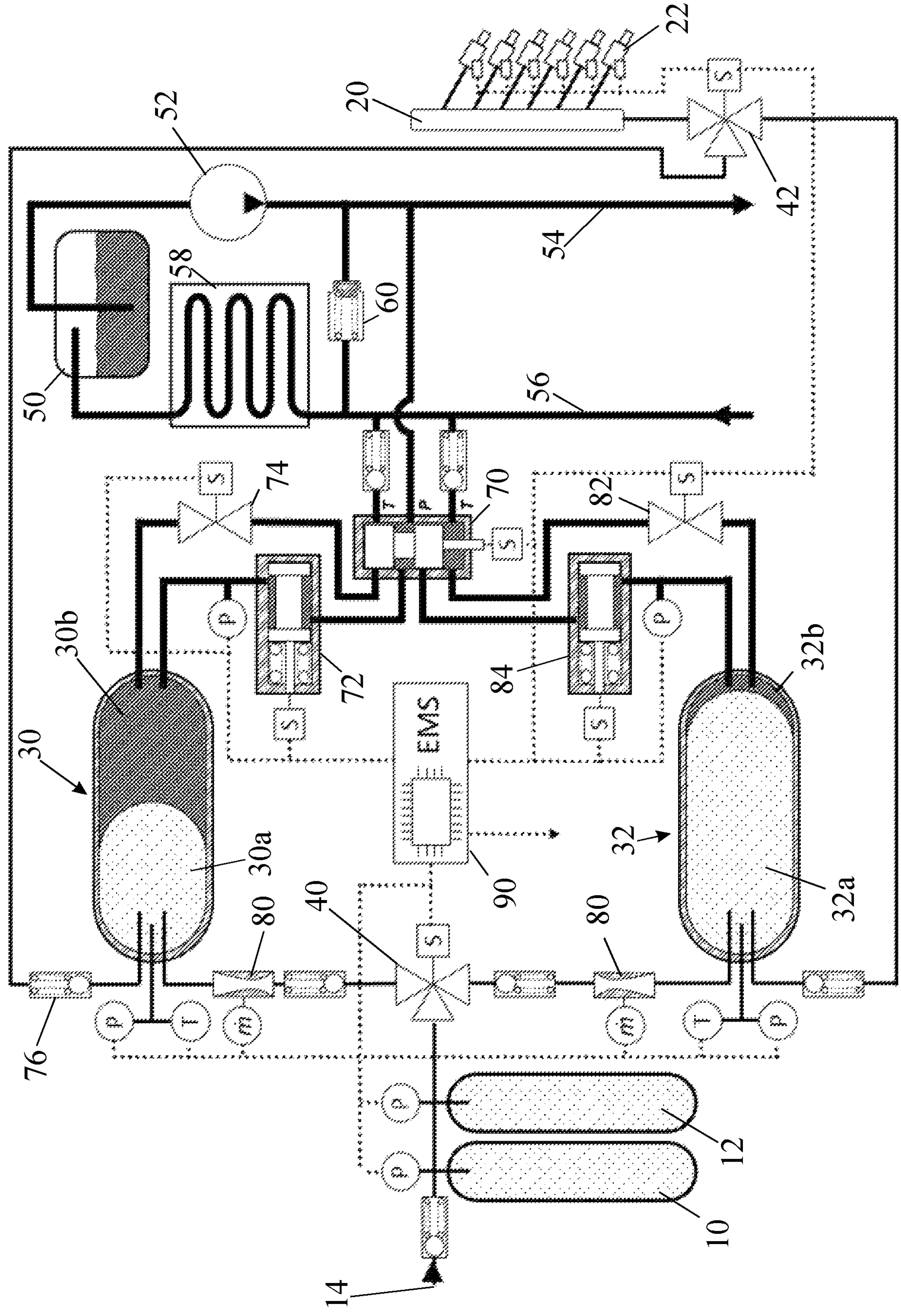
22
20
S
42
52
54
58
60
50
56
74
S
T
P
T
70
S
82
S
P
P
30b
72
84
32b
S
EMS
S
30
32
30a
32a
40
90
80
80
S
76
P
T
m
m
T
P
P
12
P
10
14

SYSTEM FOR SUPPLYING GASEOUS FUEL

CROSS-REFERENCE TO RELATED APPLICATION

This application claims priority to United Kingdom Patent Application GB 2301152.1, filed on Jan. 26, 2023, the contents of which are herein incorporated by reference in their entirety.

FIELD OF THE INVENTION

The invention relates to a system for supplying gaseous fuel to a consumer and is particularly applicable to a system for supplying hydrogen to an internal combustion engine.

BACKGROUND

The ratio of mass fuel supplied to an engine to mass of ingested air. termed the Air-fuel Ratio (AFR), is of critical importance to engine performance. Modern internal combustion engines make use of an Engine Management System (EMS) to control fuel injectors, that meter the fuel supplied to the engine accurately in proportion to the ingested air.

Engines can be Port Fuel Injected (PFI), Direct Injected (DI) or a combination of both. The delivery pressure of fuel to the injectors directly affects the time the injectors need to remain open to deliver the prescribed mass of fuel, and also, together with the injector nozzle design, determines the spray pattern of the injected mass. Together with other details of the engine design, the injection pressure play a key role in combustion quality. To improve engine performance and efficiency, recent trends are towards increasing supply pressures to injectors as these lead to improved spray patterns. Higher supply pressures are also a requirement for DI engines which need to inject directly into the combustion chambers at times when they are pressurised. The method of achieving the desired supply pressures depends on the fuel source and its storage state (solid/liquid/gas), but often includes pumps and fuel pressure regulators and a multitude of connecting pipework and sensors; the combination of all these components being termed the fuel system.

When vehicles make use of gaseous fuel, the fuel is often stored in pressure vessels, or storage tanks, where storage at high pressures allows a greater mass of fuel to be carried on the vehicle, extending its operating range. In the case of hydrogen, recent trends are towards storage at pressures many hundreds of times greater than atmospheric pressure, and often multiples of times greater than the desired supply pressures.

Two issues arise from the use of storage tanks. First, when the storage pressure is higher than the desired supply pressure, a regulator is needed to reduce the pressure from the storage pressure to the supply pressure. Gas regulators add cost and complexity and can start to limit fuel flow rates when operating at low storage pressures. Second, as the gaseous fuel stored in the tank is consumed, the storage pressure necessarily falls and once this pressure drops below the desired supply pressure then a gas compressor is required to increase the pressure to the desired supply pressure. As the storage pressure falls, the parasitic power consumption of the gas compressor rises.

Whether because of the inefficient operation, or material/design limitations, these facts result in the full capacity of fuel within gaseous storage tanks not being fully usable, ultimately limiting the operating range of the vehicle and increasing system and cost/mass.

OBJECT OF THE INVENTION

The invention seeks to provide a gaseous fuel supply system which stably maintains the desired supply pressure across the range of tank storage pressure and maximises usage of stored fuel, while reducing parasitic power consumptions and overall system and cost complexity.

SUMMARY OF THE INVENTION

According to the present invention, there is provided a system for supplying gaseous fuel to a fuel consumer at a desired supply pressure from a fuel source within which fuel is stored at a storage pressure different from the supply pressure, the system comprising at least two variable volume chambers, and valving for connecting each of the variable volume chambers cyclically and alternately to the fuel source and the fuel consumer, the valving serving during each operating cycle to connect a first of the variable volume chambers to the fuel consumer to supply fuel thereto at the desired supply pressure and to connect a second of the variable volume chambers to the fuel source to introduce a quantity of fuel into the second variable volume chamber at the storage pressure, and wherein the volume of the second variable volume chamber is changed subsequent to the introduction of the quantity of fuel therein, to change the pressure in the second variable volume chamber from the storage pressure to the supply pressure in readiness for an ensuing operating cycle.

In some embodiments, at times when the storage pressure is less than the supply pressure, the volume of said second variable volume chamber is reduced subsequent to the introduction of fuel therein to increase the pressure in the second variable volume chamber, whereby the variable volume chamber serves as a compressor.

While it is possible for the fuel source to be connected to the fuel consumer through a pressure regulator when the storage pressure is greater than the supply pressure, the volume of said second variable volume chamber may be increased subsequent to the introduction of fuel therein, whereby the variable volume chamber may additionally serve as a pressure regulator.

The volume of the first variable volume chamber, in some embodiments, is varied while connected to the fuel consumer in order to maintain the pressure in the first variable volume chamber constant for the duration of the operating cycle, despite the reduction in the mass of the fuel remaining in the variable volume chamber.

Each variable volume chamber may be formed by the working chamber of a jack, i.e. a piston/cylinder arrangement, having a motor driven piston, a control system being provided to power the motor so as to maintain a desired pressure with the working chamber of the jack.

Alternatively, each variable volume chamber may be formed by a closed vessel having an interior volume separated into two working chambers by a movable fluid impermeable wall, a first of the working chambers being the variable volume chamber connectable alternately by the valving to the fuel source and the consumer, and the second working chamber being connectable to a hydraulic of pneumatic control system to vary position of the movable wall so as to maintain a desired pressure within the first of the working chambers.

The fluid impermeable wall may be formed by a piston, a diaphragm or a bellows.

When a system of the invention is used to supply gaseous fuel to an engine of a vehicle, the hydraulic or pneumatic control system may serve additionally to power ancillary equipment of the vehicle. Thus, in a tractor, the power needed to compress the fuel when the storage pressure is below the supply pressure may be derived from a system already present to operate, for example, lifting gear or a power take-off shaft.

BRIEF DESCRIPTION OF THE DRAWINGS

The invention will now be described further, by way of example, with reference to the accompanying drawing which is a schematic diagram of a fuel supply system of the invention.

DETAILED DESCRIPTION OF THE DRAWINGS

The accompanying drawing shows a fuel supply system of the invention when used to supply gaseous fuel, such as hydrogen, to an engine of a vehicle, such as a tractor, that has its own hydraulic system used to power hydraulic ancillary equipment. In the drawings, fuel supply lines are drawn as thinner solid lines, hydraulic lines are drawn as thicker sold lines and lines carrying electrical signals are shown in dotted lines.

The fuel system has two storage tanks 10, 12, shown on the left in the drawing, that can be filled with fuel under pressure by means of a fuel line 14 to which the tanks are connected by means of a one-way valve 16. When stored in the tanks 10 and 12, the fuel may be gaseous or liquid, but it is released as gas for supply the engine. The engine is not shown in the drawing, but a fuel rail 20 and injectors 22 of the engine are shown on the right of the drawing.

The fuel supply system connecting the storage tanks 10, 12 to the fuel rail 20 comprises two hydraulic accumulators 30 and 32. Each accumulator has an interior volume separated into two working chambers 30*a*, 30*b*, 32*a*, 32*b* by a movable fluid impermeable wall, which may be a piston, a diaphragm or a bellows. The two working chambers of each accumulator are differently shaded in the drawing, the working chambers 30*a*, 32*a* on the left with the lighter shading being fuel chambers and the ones on the right 30*b*, 32*b* with darker shading being hydraulic chambers.

A first three-way solenoid operated valve 40 connects the storage tanks to one or other of the fuel chambers of the two accumulators 30, 32 while a second three-way solenoid operated valve 42 connects the fuel rail of the engine to one or other of the fuel chambers 30*a*, 32*a* of the two accumulators 30, 32. The two accumulators 30 and 32 act alternately and cyclically so that while one is being replenished by connection to the tanks 10, 12, the other is supplying fuel at the desired supply pressure to the fuel rail 20 of the engine.

The hydraulic chambers 30*b*, 32*b* of the accumulators 30, 32 are connected in the hydraulic circuit drawn in thicker sold lines. The hydraulic circuit comprises a reservoir 50 connected to a pump 52 which pressurises a hydraulic supply line 54 that may be used to power ancillary equipment of a vehicle. A return line 56 leads back to the reservoir 50 through a heat exchanger 58 that may be used to cool the circulating hydraulic fluid. A pressure regulating valve 60 is provided to limit the hydraulic pressure in the supply line 54. As so far described, all the components of the hydraulic circuit may already be present in certain types of vehicles, such as tractors.

A three-position solenoid operated spool valve 70 connects the hydraulic supply line 54 to the hydraulic working chambers of the two accumulators 30, 32. In each end position, the spool valve connects the supply line 54 to a respective one of two pressure regulators 72, 84, leading to the hydraulic working chambers of the accumulator 30 and 32, while in a central position it connects the supply line 54 to both accumulators 30, 32. The spool valve 70 also controls the return of hydraulic fluid from the hydraulic chambers 30*b*, 32*b* of the accumulator 30, 32 to the reservoir.

In the illustrated position of the spool valve 70, the hydraulic supply line 54 is connected via the pressure regulator 72 to the accumulator 30 and the return path to the reservoir 50 is blocked by the spool valve 70 and, if desired, by a two-way solenoid operated valve 74. At this time, the fuel chamber 30*a* of the accumulator 30 is not connected to the storage tanks 10, 12 and fuel is supplied to the fuel rail 20 from the accumulator 30 by way of a non-return valve 76. As fuel is taken from the fuel working chamber 30*a* of the accumulator 30, the pressure is maintained the same as the pressure in the hydraulic chamber 30*b*, which in turn is kept at the desired supply pressure by the pressure regulator 72.

While fuel is being supplied to the engine in the illustrated operating cycle from the accumulator 30, the accumulator 32 is being replenished in readiness for the next operating cycle when the two three-way valves 40 and 42 and the solenoid valve 70 are all changed over to switch between the two accumulators 30, 32. At the end of the previous cycle, the hydraulic working chamber 32*b* of the accumulator 32 will have been filled to maximum capacity by the emptying of the fuel-filled working chamber. At the commencement of the cycle, the three-way valve is opened to allow fuel to flow into fuel working chamber of the accumulator 32 and a two-way solenoid operated valve 82 will be open to allow hydraulic fluid to return from the working chamber 32*b* to the reservoir 50.

Aside from various non-return valves, the line connecting the three-way valve 40 to each accumulator includes a respective mass flow meter 80, represented by a Venturi. As an alternative to this, a single mass flow meter may be positioned in the line connecting the storage tanks 10,12 to the three-way valve 40.

The sequence of events to replenish the working chamber 32*a* while the working chamber 30*a* is supply gaseous fuel to the engine will depend on whether the storage tanks 10,12 are full or depleted, i.e. whether the prevailing storage pressure is above or below the desired supply pressure.

If the storage pressure exceeds the desired supply pressure, then at first the three-way valve, and the valve 82 in the hydraulic return line of the hydraulic chamber 32*b* of the accumulator 32, are opened to admit the correct mass of gas required to fill the accumulator at the desired supply pressure while expelling hydraulic fluid from the working chamber 32*b*. Once the desired mass has been admitted into the accumulator 32, the three-way valve 40 is closed but the valve 82 is kept open so that the fuel-filled chamber of the accumulator 32 expands to its maximum volume while continuing to expel hydraulic fluid from the hydraulic working chamber 32*b*. The fuel working chamber is then now ready to supply fuel to the rail 20 at the desired supply pressure as soon as the next changeover takes place.

If, however, the storage tanks 10, 12 are depleted and the storage pressure is below the supply pressure, then the fuel working chamber of the accumulator 32 will be filled to maximum capacity before the total mass flow measured by the mass air flow meter 80 has reached its desired value. In this case, in response to sensing of the position of the movable wall, or to detecting lack of air flow by the meter 80, the three-way valve 40 and the two-way valve 82 are closed and the spool valve 70 is moved to a position in which hydraulic fluid is supplied by way of the regulator 84 to compress the gaseous fuel stored in the working chamber 32*a* and raise its pressure to the desired supply pressure. In this case, the mass of gas stored in the working chamber 32*a* as compared to when the storage pressure is above the supply pressure, thus shortening duration of the operating cycles.

The accompanying drawing also shows various non-return valves in the fuel and hydraulic circuits. Each of these is represented in the drawing by a ball urged against an orifice by a spring, the permitted direction of flow in each case being that in which the force of the fluid on the ball opposes the spring. The purpose of these valves is self-evident Not all the non-return valves have been allocated reference numerals, as their purpose should be self-evident.

As the mass of fuel entering the engine when an injector is open is dependent not only upon the fuel pressure but also its temperature, it is important that the engine management system 90 take into consideration the fuel temperature and it is for this reason that temperature sensors are provided for the fuel working chambers 30*a* and 32*a* of the two accumulators.

To maximise the fuel mass that can be injected, it is desirable to reduce the temperature of fuel stored in the accumulators. This can be achieved not only by providing cooling on the accumulators, such as by means of cooling fins or water circulation, but by using the hydraulic fluid in the chamber 30*b* and 32*b* to cool the fuel. The heat exchanger 58 in the hydraulic circuit is desirable for this reason.

The accompanying drawing also shows an engine management system (EMS) 90 which is connected to receive signals from various pressure and temperature sensors, represented by the letters P and T in a circle and the mass flow meter(s) 80 and controls the operation of the various solenoids, represented by a letter S in a square, of the various valves 40, 42, 70, 74, 82 as well as the injectors 22 of the engine.

It will be clear to persons skilled in the art that various modifications may be made to the described embodiment without departing from the scope of the invention as set forth in the appended claims. For example, a pneumatic system is available on some vehicles, for example to operate the brakes of a heavy goods vehicle and this may be used in place of the described hydraulic circuit.

It is not essential that the two accumulators be used as regulators when the storage pressure is greater than the desired supply pressure. Thus, it would be possible to use a conventional regulator to supply fuel to the engine from the storage tanks when the storage pressure exceeds the desired supply pressure and to switch to use of accumulators only as a means of boosting the storage pressure when the latter is below the desired supply pressure.

The described supply system has only two accumulators but it will clear that it may comprise more than two. As previously mentioned, when the storage pressure drops, the frequency of switching between accumulators increases and if there is insufficient time to replenish one accumulator while fuel is being supplied by the other, then one may resort to the use of more accumulators.

As a still further possibility, in place of relying on hydraulic or pneumatic pressure to vary the volume of a fuel-filled working chamber of an accumulator, a motor may be employed to displace a movable wall mechanically under the control of a suitable feedback sensing the pressure of the stored gaseous fuel.

The gaseous fuel need not necessarily be hydrogen, but may be any combustible gas such as an alkane or natural gas.

What is claimed is:

1. A system for supplying gaseous fuel to a fuel consumer at a desired supply pressure from a fuel source within which fuel is stored at a storage pressure different from the supply pressure, the system comprising:

at least two variable volume chambers, and valving for connecting each of the variable volume chambers cyclically and alternately to the fuel source and the fuel consumer, the valving serving during each system operating cycle to connect a first of the variable volume chambers to the fuel consumer to supply fuel thereto at the desired supply pressure and to connect a second of the variable volume chambers to the fuel source to introduce a quantity of fuel in the second variable volume chamber at the storage pressure;

wherein the quantity of introduced fuel is no greater than the fuel mass required to fill the second variable volume chamber at a pressure that does not exceed the supply pressure, and the volume of the second variable volume chamber is changed subsequent to the introduction of the quantity of fuel therein, to change the pressure in the second variable volume chamber from the storage pressure to the supply pressure in readiness for an ensuing system operating cycle.

2. The system as claimed in claim 1, wherein, at times when the storage pressure is less than the supply pressure, the volume of said second variable volume chamber is reduced subsequent to the introduction of fuel therein to increase the pressure in the second variable volume chamber, whereby the variable volume chamber serves as a compressor.

3. The system as claimed in claim 1, wherein at times when the storage pressure is greater than the supply pressure, the volume of said second variable volume chamber is increased subsequent to the introduction of fuel therein, whereby the variable volume chamber serves as a pressure regulator.

4. The system as claimed in claim 1, wherein the volume of the first variable volume chamber is varied while connected to the fuel consumer in order to maintain the pressure in the first variable chamber constant for the duration of the system operating cycle.

5. The system as claimed in claim 1, wherein each variable volume chamber is formed by the working chamber of a jack having a motor driven piston, a control system being provided to power the motor so as to maintain a desired pressure with the working chamber of the jack.

6. The system as claimed in claim 1, wherein each variable volume chamber is formed by a closed vessel having an interior volume separated into two working chambers by a movable fluid impermeable wall, a first of the working chambers being the variable volume chamber connectable alternately by the valving to the fuel source and the consumer, and the second working chamber being connectable to a hydraulic or pneumatic control system to vary position of the movable wall so as to maintain a desired pressure within the first of the working chambers.

7. The system as claimed in claim 6, wherein the fluid impermeable wall is formed by a diaphragm or a bellows.

8. The system as claimed in claim 6, wherein the system serves to supply gaseous fuel to an engine of a vehicle, and wherein the hydraulic or pneumatic control system serves additionally to power ancillary equipment to the vehicle.

9. The system as claimed in claim 1, wherein cooling is provided to reduce the temperature of the gaseous fuel in the variable volume chambers.

10. The system as claimed in claim 9, wherein each variable volume chamber is formed by a closed vessel having an interior volume separated into two working chambers by a movable fluid impermeable wall, a first of the working chambers being the variable volume chamber connectable alternately by the valving to the fuel source and the consumer, and the second working chamber being connectable to a hydraulic or pneumatic control system to vary position of the movable wall wo as to maintain a desired pressure within the first of the working chambers; and wherein cooling is provided to reduce the temperature of the hydraulic or pneumatic fluid.

* * * * *